United States Patent
Leyko

(10) Patent No.: US 10,662,874 B2
(45) Date of Patent: May 26, 2020

(54) CONSTANT-VOLUME COMBUSTION MODULE FOR A TURBINE ENGINE

(71) Applicant: SAFRAN, Paris (FR)

(72) Inventor: Matthieu Leyko, Moissy-Cramayel (FR)

(73) Assignee: SAFRAN, Paris (FR)

( * ) Notice: Subject to any disclaimer, the term of this patent is extended or adjusted under 35 U.S.C. 154(b) by 304 days.

(21) Appl. No.: 15/545,992

(22) PCT Filed: Jan. 25, 2016

(86) PCT No.: PCT/FR2016/050142
§ 371 (c)(1),
(2) Date: Jul. 24, 2017

(87) PCT Pub. No.: WO2016/120551
PCT Pub. Date: Aug. 4, 2016

(65) Prior Publication Data
US 2018/0274440 A1    Sep. 27, 2018

(30) Foreign Application Priority Data

Jan. 26, 2015  (FR) ...................... 15 50588

(51) Int. Cl.
*F02C 5/12*    (2006.01)
*F23R 7/00*    (2006.01)
*F02K 7/06*    (2006.01)

(52) U.S. Cl.
CPC ............... *F02C 5/12* (2013.01); *F23R 7/00* (2013.01); *F02K 7/06* (2013.01); *F05D 2240/35* (2013.01)

(58) Field of Classification Search
CPC ...... F02C 5/12; F23R 7/00; F02K 7/06; F05D 2240/35
(Continued)

(56) References Cited

U.S. PATENT DOCUMENTS

| 2,675,675 A | * | 4/1954 | Haueter | ................... | F02C 5/12 60/39.39 |
| 2,930,196 A | * | 3/1960 | Hertzberg | ................ | F02K 7/06 60/39.76 |

(Continued)

FOREIGN PATENT DOCUMENTS

| DE | 10347588 A1 | 5/2005 |
| FR | 2866676 A1 | 8/2005 |

OTHER PUBLICATIONS

Written Opinion of the International Searching Authority dated Apr. 6, 2016, issued in corresponding International Application No. PCT/FR2016/050142, filed Jan. 25, 2016, 5 pages.

(Continued)

*Primary Examiner* — Ted Kim
(74) *Attorney, Agent, or Firm* — Christensen O'Connor Johnson Kindness PLLC

(57) ABSTRACT

A combustion module of a turbine engine, in particular of an aircraft, is configured for carrying out constant-volume combustion. The module includes a plurality of combustion chambers angularly distributed in a regular manner around an axis. Each chamber has an intake port for pressurized gas and an exhaust port for combustion gases. Each intake/exhaust port is configured to be opened or closed by a corresponding common rotating intake/exhaust valve which is coaxial with the axis.

7 Claims, 3 Drawing Sheets

(58) Field of Classification Search
USPC .................................................. 60/39.37, 247
See application file for complete search history.

(56) References Cited

U.S. PATENT DOCUMENTS

| | | | | |
|---|---|---|---|---|
| 5,901,550 | A * | 5/1999 | Bussing | B01J 3/08 |
| | | | | 60/39.39 |
| 6,349,538 | B1 * | 2/2002 | Hunter, Jr. | F02K 7/06 |
| | | | | 60/204 |
| 2002/0068250 | A1 * | 6/2002 | Nalim | F02C 3/02 |
| | | | | 431/181 |
| 2002/0139106 | A1 * | 10/2002 | Meholic | F02K 7/06 |
| | | | | 60/39.39 |
| 2005/0183413 | A1 * | 8/2005 | Kojima | F02K 7/06 |
| | | | | 60/247 |
| 2009/0139199 | A1 * | 6/2009 | Kenyon | F02C 5/02 |
| | | | | 60/39.39 |
| 2010/0242435 | A1 * | 9/2010 | Guinan | F02K 7/06 |
| | | | | 60/247 |
| 2013/0236842 | A1 | 9/2013 | Nalim et al. | |

OTHER PUBLICATIONS

International Preliminary Report on Patentability dated Aug. 1, 2017, issued in corresponding International Application No. PCT/FR2016/050142, filed Jan. 25, 2016, 1 page.

International Search Report dated Apr. 6, 2016, issued in corresponding International Application No. PCT/FR2016/050142, filed Jan. 25, 2016, 6 pages.

* cited by examiner

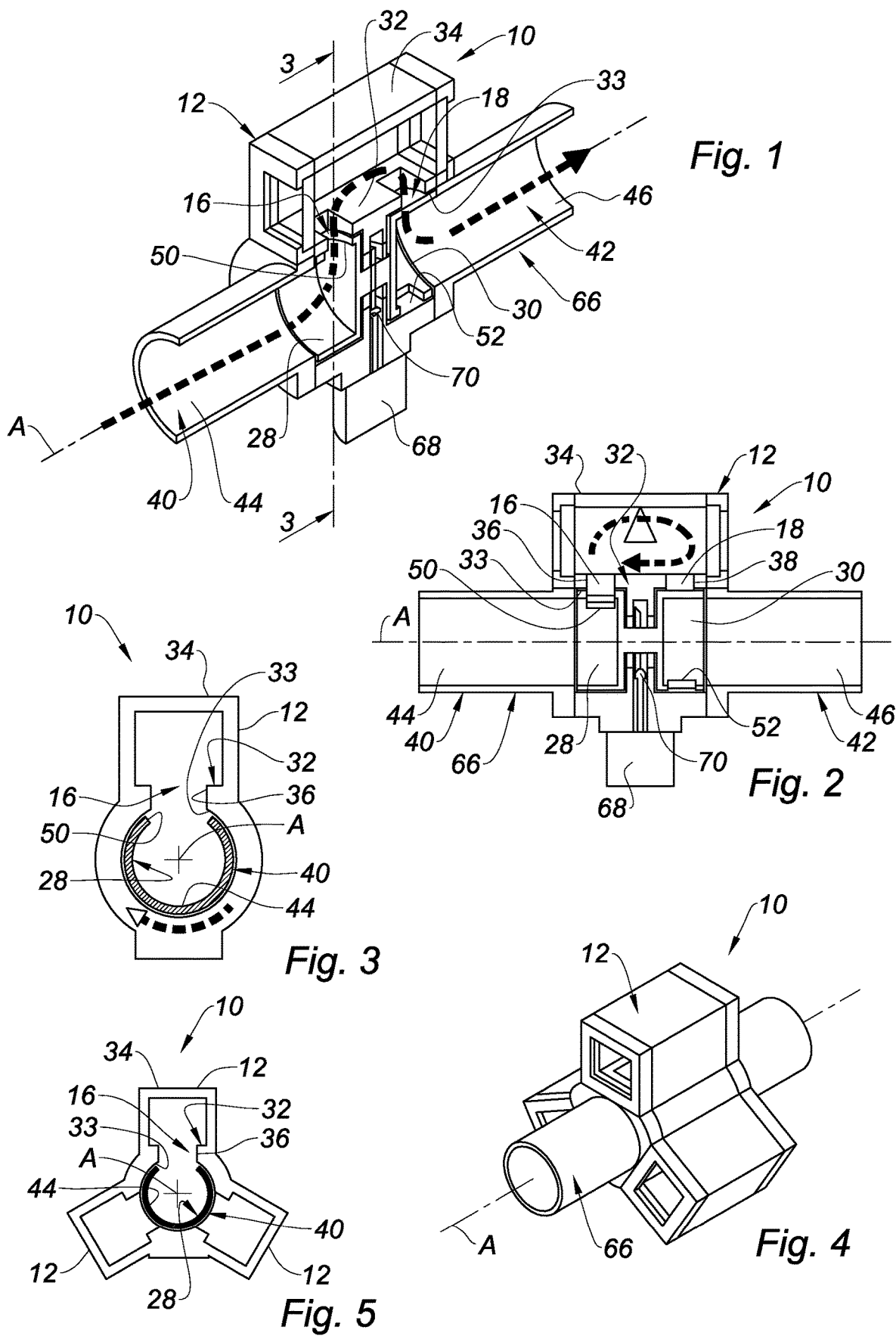

CONSTANT-VOLUME COMBUSTION MODULE FOR A TURBINE ENGINE

The invention relates to the field of combustion chambers for aircraft turbine engines, of the constant-volume combustion type.

The invention applies to any type of turbine engine, in particular to turbojet engines, turboprop engines and to unducted fan turbine engines, also known as "open rotor" turbine engines.

PRIOR ART

In a known manner, the combustion chamber of a conventional aircraft turbine engine operates according to a cycle referred to as the Brayton cycle, that is to say a constant-pressure combustion cycle. Nevertheless, in order to achieve gains in terms of specific consumption, it has been envisaged to replace the combustion chamber operating according to a Brayton cycle with a combustion chamber operating according to a Humphrey cycle, that is to say a constant-volume combustion cycle, or "CVC".

The concept of constant-volume combustion cycles has been known for a long time from ramjet engines, such as that described in FR-2.866.676-A1. This document describes a ramjet engine, the single combustion chamber of which comprises a rotating intake valve and a rotating exhaust valve.

However, the concept of constant-volume combustion cycles has been applied only rarely to combustion modules which are intended to supply a turbine of a turbine engine.

FR-2.945.316 describes an embodiment of a CVC combustion chamber. The chamber comprises at the input thereof an intake valve for pressurised gas composed of two rotating elements having a substantially ovoid cross-section which are rotatably mounted along axes which are parallel to one another and perpendicular to the axis of the chamber, said elements being capable of determining, when they are separated, a position for opening the valve, and when they are joined, a position for closing the valve. In the same manner, the chamber comprises, at the output thereof, a similar exhaust valve which is capable of varying between an open position and a closed position.

The positions of the vanes are driven in a synchronous way in order to enforce the three successive steps of the Humphrey cycle, that is to say inlet/sweeping out, combustion, and exhaust.

In this solution, the design of the intake and exhaust valves has proven to have room for improvement, in particular in terms of robustness and sealing, the sealing being able to be problematic in particular during the strong pressurisation observed during the combustion phase, as a result of the imperfect sealing of the elements having an ovoid cross section.

Document US 2013/236842-A1 describes a combustion module of a turbine engine, in particular of an aircraft, which is configured to carry out constant-volume combustion, comprising a rotor between two stators, the rotor comprising a plurality of axial channels, the input or the output of which can be closed or released by passing in front of the intake or exhaust ports or can pass in front of an ignition module. This configuration supplied by a system of slots has imperfect sealing.

In order to remedy these disadvantages, document WO-2014/020275-A1 proposed a CVC combustion chamber comprising spherical valves having spherical rotors which are rotatably mounted around axes which are perpendicular to the axis of the chamber and combined with spherical casings of these rotors, said rotors and said casings having channels and slots which are capable of being aligned with one another and with input and output channels of the combustion chamber to selectively determine the opening or closing of the corresponding intake and exhaust valves. Each chamber comprises a spherical valve at each of the ends thereof, and said valves are synchronised with one another in order to carry out the three successive phases of the Humphrey cycle.

In this solution, the design of the intake and exhaust valves is largely improved, in particular in terms of sealing, but nevertheless has numerous disadvantages. Firstly, the movements of the spherical rotors in the casings cause a great deal of rubbing, which is detrimental to the durability of such valves. Secondly, the valves are difficult to produce due to the spherical shape of the elements thereof. Thirdly, in this design, the valves remain independent and must be synchronised, and as a result the complexity of the combustion chamber is not improved. Fourthly and lastly, each chamber requires an intake valve and an exhaust valve belonging thereto, in such a way that a turbine engine comprising a plurality of chambers has as many intake valves and exhaust valves as it has chambers.

Document DE-10.347.588-A1 also proposed a turbine engine comprising a compressor and a turbine connected by a common shaft, and a single CVC combustion chamber which is arranged on the periphery of the turbine engine around the shaft and between the compressor and the turbine. The CVC chamber can take in intake gases by means of a rotating intake valve and evacuate the exhaust gases towards the turbine by means of a rotating exhaust valve. The rotating intake and exhaust valves are each formed by two concentric rings provided with bladings, the bladings of the two rings being spaced according to the same angular spacing. The bladings of each ring thus define a plurality of passages which are each arranged between two consecutive blades of the ring. The bladings of each inner ring are thus capable of closing or releasing the passage between two bladings of the corresponding outer ring, depending on whether the blades of the inner ring close the passages between the blades of the outer ring, or whether they are aligned with the blades of the outer ring and thus release the passages between the blades of the outer ring. Furthermore, the blades of each inner ring aerodynamically extend those of the outer ring in a position for aligning the blades corresponding to the complete opening of the rotating valve.

In this solution, the sealing proposed by the rotating valves is imperfect because, in the closed position of the valve, the blades of each inner ring cannot angularly cover those of the corresponding outer ring at the risk of only imperfectly extending the blades of the outer ring in the position for aligning the blades corresponding to the open position of the valve, and thus constituting an obstacle to the flow of the gases. The sealing at the junction of the edges of the inner ring and the edges of the blades of the inner ring is thus actually carried out only at the edge of said blades, along an extremely fine sealing line, and as a result is thus precarious.

Furthermore, as the blades of the rings are angularly distributed in a regular manner along the entire periphery of these rings, this solution can be applied only to a single and peripheral CVC chamber because a division into a plurality of discrete chambers would lead to having angular sectors of the rings, which are even reduced, which would be located between two chambers and which would no longer allow gases to pass into this region, thus leading to the intake of expulsions of the intake gases or at the very least to disruptions of the flow of said gases.

SUMMARY OF THE INVENTION

The aim of the invention is thus to remedy the above-mentioned disadvantages relating to the embodiments from the prior art.

For this purpose, the invention generally proposes a combustion chamber of an aircraft turbine engine of the constant-volume combustion type, preferably comprising chambers distributed according to a radiating structure, in particular in the shape of a barrel, and operating according to out-of-phase cycles, in order to ensure a homogeneous supply to at least one turbine engine turbine arranged downstream of the chambers. Matching this architecture, the invention generally proposes an intake valve which is common to all the chambers and an exhaust valve which is common to all the chambers.

For this purpose, the invention proposes a combustion module of a turbine engine, in particular of an aircraft, configured for carrying out constant-volume combustion, comprising at least a plurality of combustion chambers arranged around an axis, such as an axis of the turbine engine, each chamber having an intake port for pressurised gas and an exhaust port for combustion gases, a corresponding rotating intake/exhaust valve which is respectively associated with each intake and exhaust port, coaxial with said axis, and each intake/exhaust port being configured to be opened or closed by said rotating intake/exhaust valve, characterised in that it comprises a plurality of combustion chambers which are angularly distributed in a regular manner around said axis, the intake ports of which are configured to be opened or closed by a common rotating intake valve, and the exhaust ports of which are configured to be opened or closed by a common rotating exhaust valve.

According to other features of the module:
the rotating intake/exhaust valves are synchronised in rotation with one another,
each port comprises a radial opening which is formed in a longitudinal wall of the combustion chamber having a surface in the form of a cylinder portion which is coaxial with the axis, and each rotating intake/exhaust valve has a tubular element for each intake/exhaust port of the chamber, which is rotatably mounted coaxially with said axis and comprises at least one radial slot which is arranged substantially in an axial plane of the radial opening of said port which is rotatably mounted in said surface in the form of a cylinder portion or around said surface in the form of a cylinder portion, and which is capable of closing or releasing said radial opening during the rotation of said tubular element,
the surface in the form of a cylinder portion of the longitudinal wall of each combustion chamber is rotated towards the axis, and the tubular element of each valve is rotatably mounted inside said surface, said tubular element comprising an internal bore defining an intake/exhaust gas duct allowing the transportation of the intake/exhaust gases,
each combustion chamber comprises two opposing walls which are outer and inner respectively, having at least respective outer and inner surfaces shaped into cylinder portions, said respective outer and inner walls each having one of said ports having a radial opening formed in said inner or outer wall, and said module comprises an outer/inner rotating tubular valve associated with each outer/inner surface of the outer/inner wall of the combustion chamber, which has a tubular element having a diameter corresponding to said outer or inner wall and rotatably mounted coaxially in or around said corresponding outer/inner surface, said tubular element having a slot arranged substantially in an axial plane of the radial opening of said port which is capable of closing or releasing said radial opening during the rotation of said tubular element,
each combustion chamber is coaxially arranged around the end of an internal tubular case element comprising a duct having an annular cross section, the duct having an end which opens into the periphery of said internal tubular element, which is arranged opposite the opening of the inner wall of the chamber, the internal rotating valve being radially interposed between said internal tubular case element and the inner wall of the combustion chamber,
the combustion chamber is arranged coaxially inside an external tubular case element comprising an annular duct, the external rotating valve being arranged around the outer wall of each combustion chamber in said annular duct of the external tubular case element,
the intake port is associated with the outer wall of each combustion chamber, the intake gases being transported through the annular duct of the external tubular case element, and the exhaust port is associated with the inner wall of each combustion chamber, the intake gases being evacuated through the duct of the internal tubular case element,
the combustion module comprises a common closing element which has the rotating intake/exhaust valves which are interconnected for conjoint rotation.

The invention also relates to a turbine engine comprising a compressor module, having at least one compressor, and a turbine module, having at least one turbine, said turbine engine comprising a combustion module of the type described previously which is supplied by the compressor module and which supplies the turbine module.

For example, in a particularly advantageous and simple embodiment, the turbine engine comprises a system of shafts which connects the compressor module to the turbine module. The compressor module supplies the combustion module by means of a single intake duct, which combustion module supplies the turbine module by means of a single exhaust duct, and at least one shaft of the system of shafts forms the means for driving the common closing element.

In a variant, in another embodiment which is particularly advantageous because it allows a great opportunity to optimise control of the combustion, said turbine engine comprises a combustion module which is supplied by the compressor module and which supplies the turbine module, said combustion module having an intake valve and an exhaust valve which can be dephased in an active manner according to the different operating phases of the turbine engine. Thus, the valves can be powered by a common drive means and engaged with one another, or disengaged or dephased in a selective manner, but they can also be driven independently of one another whilst being selectively synchronised, desynchronised or dephased with respect to one another.

The invention will be better understood, and other details, features and advantages of the present invention will become clearer upon reading the following description, given by way of non-limiting example with reference to the accompanying drawings, in which:

FIG. 1 is a perspective view intersected by an axial plane of a concept for producing a combustion module according to the invention;

FIG. 2 is a schematic axial section of the combustion module from FIG. 1;

FIG. 3 is a schematic cross section of the combustion module from FIG. 2;

FIG. 4 is a perspective view of a first embodiment of a combustion module according to the invention;

FIG. 5 is a schematic cross section of the combustion module from FIG. 4;

In the following description, same reference numerals denote parts which are the same or have similar functions.

FIGS. 1 to 5 and FIG. 8 show a combustion module 10 produced in accordance with the invention. In a known manner, the module 10 is configured to implement constant-volume combustion taking place according to the Humphrey cycle, that is to say having a time for combustion, a time for evacuation, and a time for the intake of fresh air and sweeping out combustion gases.

Figure 6:
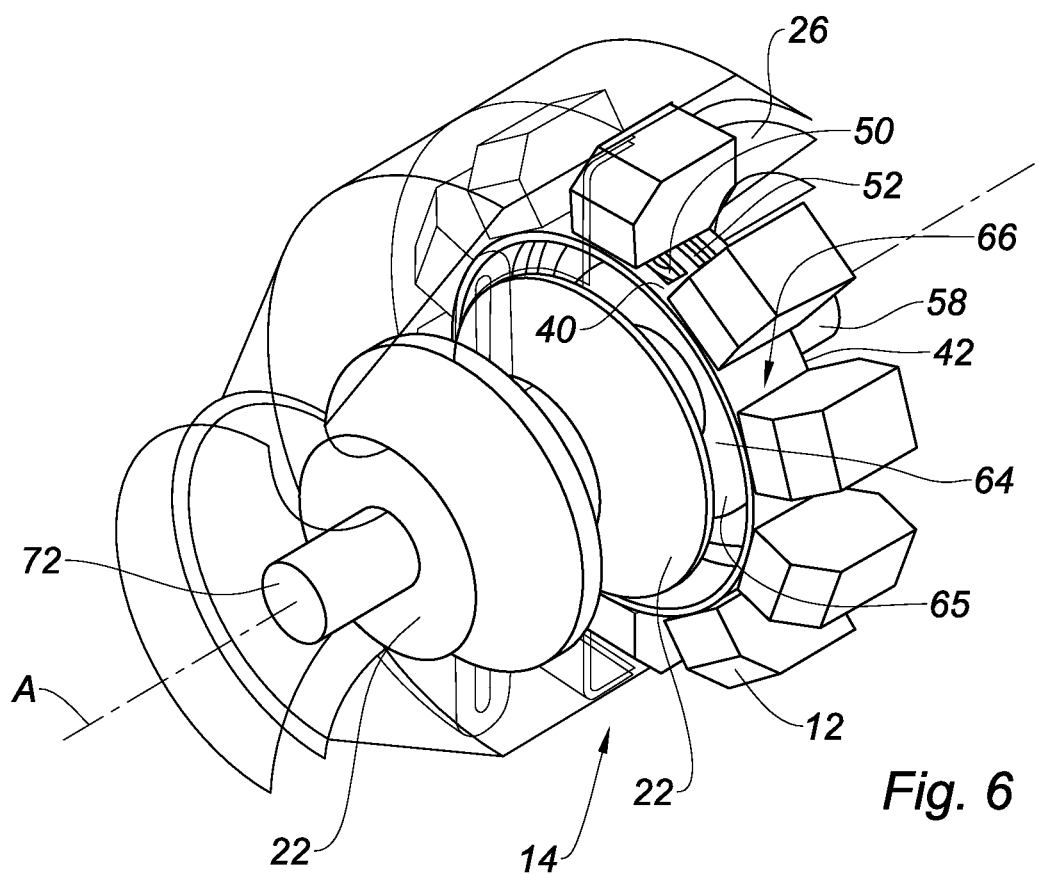
FIG. 6 is a perspective view with a cut-out of a turbine engine comprising a combustion module according to a second embodiment.

In a known manner, the module 10 comprises a plurality of combustion chambers 12 arranged around an axis "A", of which just one has been shown in FIGS. 1 to 3 to facilitate comprehension thereof. A configuration comprising a plurality of chambers 12 has been shown in FIG. 6, which shows a turbine engine 14 comprising ten combustion chambers 12 arranged around the axis "A" of the turbine engine. In a manner which does not limit the invention, the axis "A" can for example coincide with an axis of rotation of the turbine engine.

As shown in FIGS. 1 and 2, each chamber 12 comprises an intake port 16 for pressurised gas and an exhaust port 18 for combustion gases. In a turbine engine of the type which has been shown in FIGS. 6 and 7, the intake port 16 for pressurised gas is supplied by a compressor module 20 of the turbine engine 14 comprising at least one compressor 22, and the exhaust port 18 for gas supplies at least one turbine module 24 comprising at least one turbine 26.

In accordance with the invention, each intake port 16 or exhaust port 18 is configured to be opened or closed by a rotating intake valve 28 or by a corresponding exhaust valve 30, which is coaxial with the axis A of the turbine engine 14.

For the comprehension of the invention, the module 10 which has been shown in FIGS. 1 to 3 comprises only one combustion chamber 12. The direction of rotation of the rotating intake valve 28 has been shown by a dotted arrow in FIG. 3.

However, in the preferred embodiment of the invention, the module 10 comprises at least two combustion chambers 12 which are angularly distributed in a regular manner around the axis A, the intake ports 16 of which are configured to be opened or closed by a common rotating intake valve 28, and the exhaust ports 18 of which are configured to be opened or closed by a common rotating exhaust valve 30. The intake valve 28 and the exhaust valve 30 can rotate together or can be parts which can rotate differently.

FIG. 5 shows by way of example a first embodiment of a module 10 comprising a common rotating intake valve 28 which supplies the three intake ports 16 of the three combustion chambers 12 of the same module 10.

Similarly, FIG. 6 shows the example of a second embodiment of the module 10 comprising a common rotating intake valve 28 which supplies the intake ports of ten combustion chambers 12 of the same module 10 and a rotating exhaust valve 30 which is supplied by the ten exhaust ports of the ten combustion chambers 12 of said module 10.

This configuration is particularly advantageous because it makes it possible to supply a plurality of chambers 12 with a single intake valve 28 and to evacuate the gases therefrom with a single exhaust valve 30, and this makes it possible to considerably simplify the architecture of a turbine engine comprising a combustion module 10 of this type with respect to the designs previously known from the prior art.

The combustion chambers 12 are angularly distributed in a regular manner around the axis A, and each have a direction which is preferably oriented in a substantially axial direction, so as to form a structure in the shape of a barrel. However, this configuration does not limit the invention, and the chambers could be arranged according to another orientation. For example, the chambers could also be angularly distributed in a regular manner around the axis A, but each having a direction which is preferably oriented in a substantially radial direction, so as to form a structure in the shape of a star. Thus, it will be understood that a main feature of the invention is that the chambers 12 can be arranged in a radiating manner.

Preferably as well, the combustion cycles of the chambers 12 are offset by an interval which is dependent on the number of chambers 12. This allows to smooth the flow of the exhaust gases supplied to the turbine module 24 by smoothing the pulse phenomena which are inherent to the constant-volume combustion cycles. In fact, if all the chambers 12 were operating simultaneously following the same times of the Humphrey cycle, the exhaust phases would all be simultaneous, and this would result in an irregular flow of exhaust gases due to being subjected to the simultaneous pulsing of the gases coming from the chambers 12. In contrast, a combustion module 10 comprising cycles of offset chambers 12 allows to smooth said pulses. It will be noted that the intake of exhaust gas by the turbine module 24 will be as homogeneous and free from pulses as the number of chambers 12 will be high.

Thus, preferably, a combustion module comprising a determined number "n" of chambers 12 will observe the cycles of the offset chambers thereof. For a number of "n" chambers, a number of chambers less than half "n/2" of the number "n" of chambers will be operated at the same time to balance the loads on the rotating valves. In particular, two opposing chambers will be on the same cycle phase, considering for example for four chambers at a determined moment two chambers in combustion and two chambers without combustion.

In the preferred embodiment of the invention, the rotating intake 28 and exhaust 30 valves are synchronised in rotation with one another, rotating at the same rotational speed.

This synchronisation can be achieved by any means known from the prior art, in particular in a mechanical manner.

It should be noted that it is possible to provide an adjustable dephasing device between the rotating intake 28 and exhaust 30 valves in order for example to be able to modify the dephasing of the rotating intake 28 and exhaust 30 valves according to the conditions of use of the combustion module 12, the rotating intake 28 and exhaust 30 valves, once a speed has been established, remaining synchronised in rotation with one another.

A preferred embodiment of the chambers 12 and the valves 28, 30 will now be described.

In a preferred embodiment of the invention, each combustion chamber 12 comprises at least one wall 32, 34 having a surface 33, 35 in the form of a cylinder portion which is coaxial with the axis A.

In the first and second embodiments of the invention described previously, the chambers 12 comprise a first longitudinal wall 32 having a surface 33 in the form of a cylinder portion, rotated towards the axis A, that is to say an inner wall 32, which has the two intake 16 and exhaust 18 ports, and additionally a second longitudinal wall 34, rotated away from the axis A, that is to say an outer wall 34, which has no intake or exhaust ports.

Figure 8:
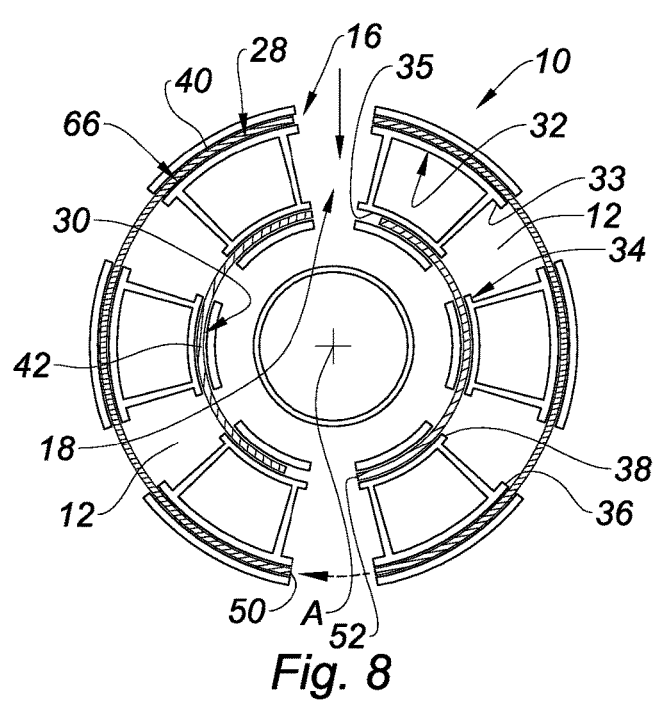
FIG. 8 is a cross-sectional view of a third embodiment of a combustion module according to the invention.
Figure 9:
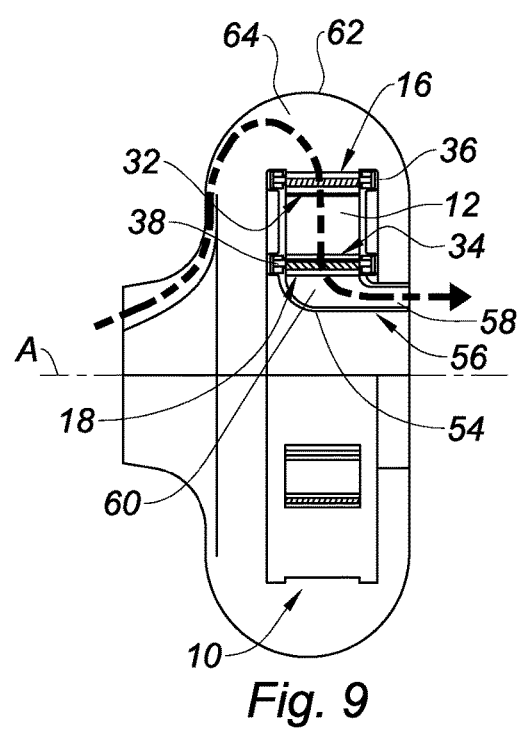
FIG. 9 is an axial sectional view of the combustion module from FIG. 8 and of a casing of an associated turbine engine.

In a third embodiment shown in FIGS. 8 and 9, each combustion chamber 12 comprises, extending longitudinally, a first outer wall 32, which is coaxial with the axis A and comprises at least one surface 33 in the form of a cylinder portion which is rotated away from said axis A, that is to say rotated outwardly, and which has the intake port 16, and a second inner wall 34, extending longitudinally, and having at least one surface 35 in the form of a cylinder portion, which is coaxial with the axis A and rotated towards the axis A, that is to say rotated inwardly, and which has the exhaust port 18.

It will be understood that other configurations are possible without changing the nature of the invention, for example a configuration according to which the intake 16 and exhaust 18 ports would be arranged on a wall which is coaxial with the axis A and rotated away from said axis A, or a substantially reversed configuration of the third embodiment.

Each port 16, 18 comprises, according to the chosen configuration, a radial opening 36, 38 which is formed in the corresponding longitudinal wall 32, 34 of the combustion chamber, the surface 33 and/or cylinder portion 35 of which is coaxial with the axis A. Each rotating intake 28/exhaust 30 valve comprises a corresponding tubular element 40, 42, having a diameter corresponding to said cylinder portion, which is rotatably mounted coaxially in the cylinder portion or around the cylinder portion of the surface 33 and/or 35 of the respective wall 32, 34. Said tubular element 40, 42 comprises a bore defining a duct 44, 46 for intake/exhaust gas which extends axially at a right angle to the combustion chamber 12, and it comprises at least one radial hole 50, 52 opening respectively into the duct 44, 46 and arranged substantially in an axial plane of the radial opening 36, 38 of said port 16, 18, which is capable of allowing the release or the closure of said radial opening 36, 38 during the rotation of said tubular element 40, 42 depending on whether or not the radial hole 50, 52 set into rotation with the tubular element 40, 42 passes in front of the radial opening 36, 38 of said port 16, 18.

Thus, in the conceptual view and the first and second embodiments shown in FIGS. 1 to 7, the surface 33 in the form of a cylinder portion of the wall 32 of the combustion chamber 12 is rotated towards the axis A, and the tubular element 40, 42 of each valve 28, 30 is mounted so as to rotate inside said surface 33. Each tubular element 40 or 42 comprises an internal bore 44, 46 defining the intake/exhaust gas duct which is thus formed in the tubular element 40, 42, and which makes it possible to transport the intake gases and evacuate the exhaust gases in the direction of the flow of said gases, as shown by the arrow in FIG. 1.

Figure 7:
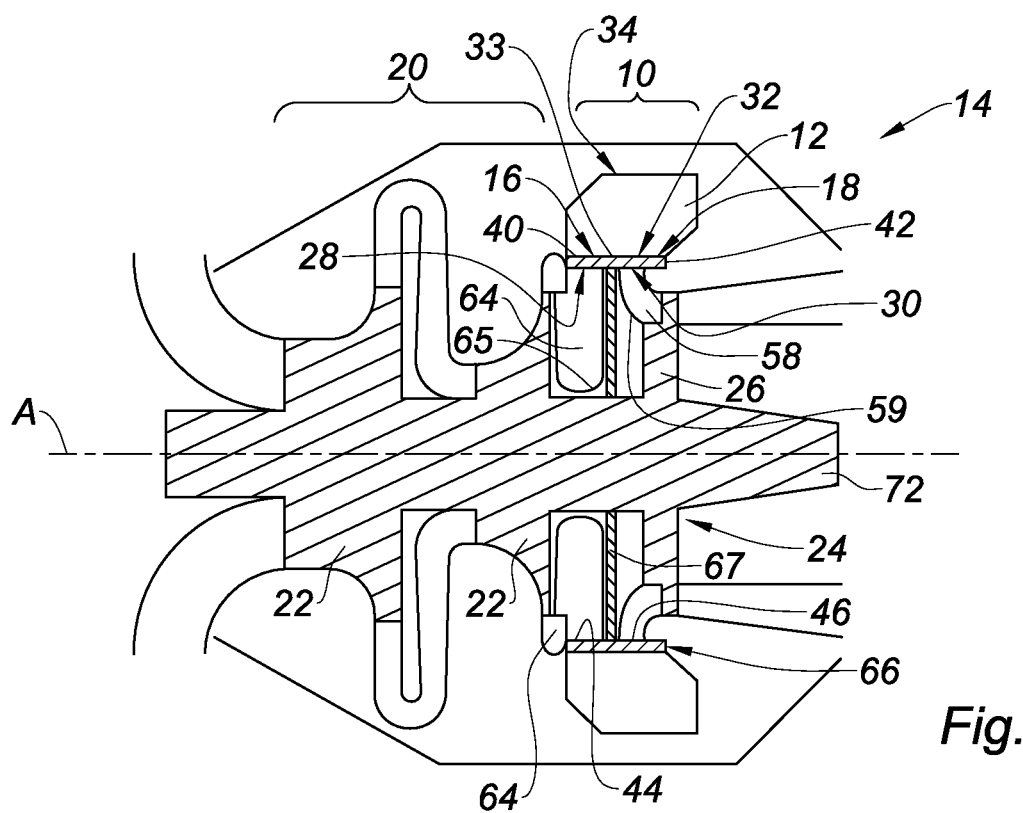
FIG. 7 is a schematic axial section of the turbine engine from FIG. 6.

In the specific case of the second embodiment shown in FIGS. 6 and 7, each tubular element 40, 42 is annular and defines a corresponding internal bore 44, 46. The bore 44 in the tubular element 40 is designed to surround a duct for transporting the gases 64 coming from the compressor 22, and in the same manner the bore 46 in the tubular element 42 surrounds a duct for evacuating the gases 58 from the turbine 26. In particular, the duct for transporting the gases can be delimited close to the combustion chamber 12 by an annular intake guide 65, and the duct for evacuating the gases can be delimited close to the combustion chamber 12 by an annular exhaust guide 59.

In the third embodiment shown in FIGS. 8 and 9, each combustion chamber 12 comprises two opposing walls which are outer 32 and inner 34 respectively, which comprise at least respective outer 33 and inner 35 surfaces in the shape of cylinder portions. The walls 32, 34 each comprise a port 16, 18 having a radial opening 36, 38 formed in said outer wall 32 or inner 34 wall. The combustion module 10 comprises an outer rotating tubular valve 28 and an inner rotating tubular valve 30, associated with each outer 32 and outer 34 wall of the combustion chamber 12, which each comprise a respective tubular element 40, 42 having a diameter corresponding to said outer or inner wall and which is rotatably mounted coaxially with the corresponding outer 33 or inner 35 surface in the form of a cylinder portion. Each tubular element 40, 42 comprises at least one hole 50, 52 arranged substantially in an axial plane of the radial opening 36, 38 of the port 16, 18 which is capable of closing or releasing said radial opening 36, 38 during the rotation of said tubular element 40, 42.

Thus, the main difference between, firstly, the first and second embodiments of the invention, and secondly the third embodiment, is that in the first and second embodiments of the invention, the tubular elements 40, 42 forming the valves 28, 30 cooperate with the same wall 32, the axially offset ports 16, 18 of which they release or close, whereas in the third embodiment of the invention, the tubular elements 40, 42 cooperate with two radially offset walls 32, 34, the ports 16, 18 of which they release or close, said ports 16, 18 being at least offset radially.

It should be noted that in the third embodiment, the ports 16, 18 can also be axially offset without this having a limiting effect on the invention.

As shown in FIG. 9, in the third embodiment of the invention, each combustion chamber 12 is arranged coaxially around the end 54 of an inner tubular case element 56 comprising a duct 58 having an annular cross section. The duct 58 comprises an end 60 which opens into the periphery of said internal tubular element 56 which is arranged opposite the opening 38 of the inner wall 34 of the chamber 12, and the internal rotating valve 30 is radially interposed between said internal tubular case element 56 and the inner wall 34 of the combustion chamber 12.

Similarly, the combustion chamber 12 is arranged coaxially inside an external tubular case element 62 comprising an annular duct 64, and the external rotating valve 28 is arranged around the outer wall 32 of the combustion chambers 12 inside said annular duct 64 of the external tubular case element 62.

Preferably, in this third embodiment, the intake port 16 is associated with the outer wall 32 of each combustion chamber 12, the intake gases being transported through the annular duct 64 of the external tubular case element 62, and in a corresponding manner, the exhaust port 30 is associated with the inner wall 34 of the combustion chambers 12, the intake gases being evacuated through the duct 58 of the internal tubular case element 56.

It will be understood that this configuration is not intended to limit the invention and could be reversed. Furthermore, for example, the intake and the exhaust could be axially offset, subject to a greater length of the combustion chamber.

One particularly advantageous feature of the invention is that the combustion module 10 can comprise a common closing element 66 which has the rotating intake 28 and exhaust 30 valves and which is powered, for example, by a single drive means, the valves thus being interconnected for conjoint rotation. This configuration makes it possible to achieve, in a very simple manner, the synchronisation of the intake 28 and exhaust 30 valves. However, this configuration does not limit the invention, and the rotating intake 28 and exhaust 30 valves can be powered by different but synchronised drive means.

For example, in the particular case of the second embodiment shown in FIGS. 6 and 7, the closing element 66 is shaped in the form of a wheel comprising a plate 67 in the form of a disc to which the two tubular elements 40, 42 are joined on either side.

Said closing element 66 can be driven in various ways. For example, the closing element 66 can be driven by a motor 68 and a coupling by an angular gear unit 70, as shown in FIG. 1, but more simply, the closing element 66 can be coupled to a system of shafts of the turbine engine associated by means of a suitable reduction.

In a variant, the intake 28 and exhaust 30 valves can of course be driven by separate drive means, which are for example synchronised.

The invention can thus of course be applied to a turbine engine used in aeronautic propulsion, comprising a compressor module 20 having at least one compressor 22 and a turbine module 24 having at least one turbine 26. A turbine engine of this type comprises a combustion module 10 of the type described previously, supplied by the compressor module 20 and supplying the turbine module 24.

One example of a turbine engine 14 of this type, as shown in FIGS. 6 and 7, comprises for example, as has been seen previously, a compressor module 20 having at least one compressor 22, a combustion module 10 of the type described previously, and a turbine module 24 having at least one turbine 26. In this configuration, the module 22 is connected to the turbine module 24 by a system of shafts 72.

In this configuration, as shown in FIGS. 6 and 7, the compressor module 22 supplies the combustion module 10 with intake gas for example by means of a single intake duct, which combustion module 10 supplies the turbine module 24 with exhaust gas by means for example of a single exhaust duct 58, and at least one shaft of the system of shafts 22 forms the means for driving the common closing element 66.

In a variant, in another embodiment which is particularly advantageous because it would give great opportunity to optimise control of the combustion, said turbine engine could comprise a combustion module having an intake valve and an exhaust valve 10 which could be dephased in an active manner according to the different operating phases of the turbine engine. Thus, the valves could be powered by a common drive means and engaged with one another, or disengaged or dephased in a selective manner, but they can also be driven independently of one another whilst being selectively synchronised, desynchronised or dephased with/from one another.

The invention thus makes it possible to achieve, in a simple and reliable manner, the intake and the evacuation of the chambers 12 of a combustion module 10 of the constant-volume type.

FIGS. 10 to 14 show different possible applications to different types of propulsion systems.

Figure 10:
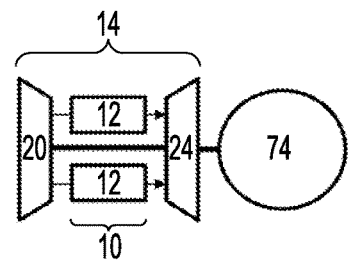
FIGS. 10 to 14 are schematic views of different turbine engine architectures implementing a combustion module according to the invention.

FIG. 10 shows a first type of system in which a turbine engine 14 drives a load 74, such as a turboprop engine propeller, directly or via a reducer. In this case, the turbine module 24 is directly coupled to the load 74.

Figure 11:
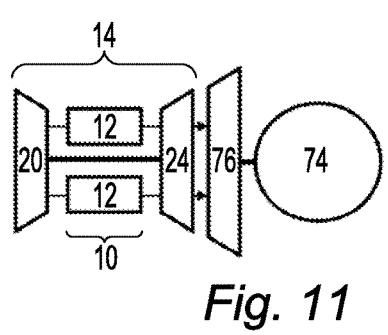

FIG. 11 shows a second type of system in which a turbine engine 14 drives a free turbine 76, which in turn directly drives a load 74, such as a turboprop engine propeller. In this case, the exhaust gases of the turbine module 24 drive the free turbine 76.

Figure 12:
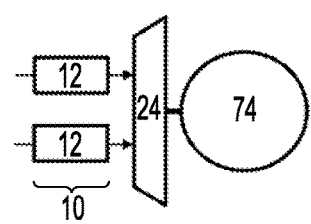

FIG. 12 shows a third type of system in which a combustion module 10 drives a turbine module 24, which in turn directly drives a load 74, such as a turboprop engine propeller. In this case, it is the exhaust gases of the combustion module 10 which drive the turbine module 24.

Figure 13:
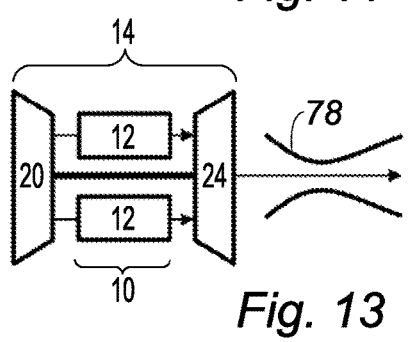

FIG. 13 shows a fourth type of system in which a turbine engine 14 of the type previously described ejects gases into an exhaust nozzle 78. In this case, the propulsion is ensured by reaction.

Figure 14:
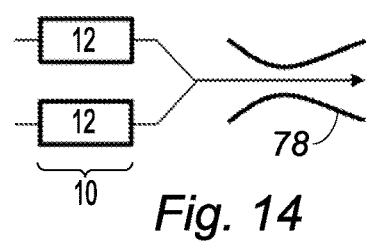

Lastly, FIG. 14 shows a fifth type of system in which a combustion module 10 directly ejects gases into an exhaust nozzle 78. In this case, the system is reduced to the simplest expression thereof and is very close in operation to a ramjet engine, with the difference that it has a higher number of combustion chambers 12 which are synchronised in the operating cycles thereof. The operating pressure is thus higher. The propulsion is also ensured by reaction.

The invention thus proposes a new type of propulsion system which is particularly advantageous in that, at equal thrust, it is estimated that such a system can facilitate a gain in consumption of from 10% to 20% in relation to a conventional turbine engine.

The invention claimed is:

1. A combustion module of a turbine engine configured for carrying out constant-volume combustion, comprising a plurality of combustion chambers arranged around an axis, each combustion chamber having an intake port configured to receive pressurized gas and an exhaust port configured to discharge combustion gases, a corresponding rotating intake/exhaust valve which is respectively associated with each intake and exhaust port, coaxial with said axis, and each intake/exhaust port being configured to be opened or closed by said rotating intake/exhaust valve, wherein the combustion chambers are angularly distributed in a regular manner around said axis, the intake ports of which are configured to be opened or closed by a common rotating intake valve, and the exhaust ports of which are configured to be opened or closed by a common rotating exhaust valve according to a Humphrey cycle comprising a phase for the intake of fresh air and for sweeping out combustion gases, a combustion phase, and an exhaust phase, wherein each combustion chamber comprises two opposing walls which are outer and inner respectively, having at least respective outer and inner surfaces shaped into cylinder portions, said respective outer and inner walls each having one of said ports having a radial opening formed in said inner or outer wall, and wherein said module comprises an outer/inner rotating tubular valve associated with each outer/inner surface of the outer/inner wall of the combustion chamber, which has a tubular element having a diameter corresponding to said outer or inner wall and rotatably mounted coaxially in or around said corresponding outer/inner surface, said tubular element having a slot arranged substantially in an axial plane of the radial opening of said port which is configured to close or release said radial opening during the rotation of said tubular element.

2. The combustion module according to 1, wherein the rotating intake/exhaust valves are synchronised in rotation with one another.

3. The combustion module according claim 1, wherein each combustion chamber is coaxially arranged around the end (54) of an internal tubular case element comprising a duct having an annular cross section, the duct having an end which opens into the periphery of said internal tubular element, which is arranged opposite the opening of the inner wall of the chamber, the inner rotating tubular valve being radially interposed between said internal tubular case element and the inner wall of the combustion chamber.

4. The combustion module according to claim 3, wherein each combustion chamber is arranged coaxially inside an external tubular case element comprising an annular duct, the outer rotating tubular valve being arranged around the outer wall of each combustion chamber in said annular duct of the external tubular case element.

5. The combustion module according to claim 4, wherein the intake port is associated with the outer wall of each combustion chamber, the intake gases being transported through the annular duct of the external tubular case element, and wherein the exhaust port is associated with the inner wall of each combustion chamber, the intake gases being evacuated through the duct (58) of the internal tubular case element.

6. The combustion module according to claim 1, wherein the combustion chambers comprise a common closing element which has the intake/exhaust rotating valves which are interconnected for conjoint rotation.

7. A turbine engine comprising a compressor module having at least one compressor and a turbine module having at least one turbine, wherein the turbine engine comprises a combustion module according to claim 1, which is supplied by the compressor module and supplies the turbine module.

* * * * *